United States Patent

Whaley

[15] 3,638,345
[45] Feb. 1, 1972

[54] ADJUSTABLE PURSE RING STRIPPER
[72] Inventor: Morris L. Whaley, 4140 The Hill Road, Bonita, Calif. 92001
[22] Filed: Oct. 6, 1969
[21] Appl. No.: 864,138

[52] U.S. Cl. .................................................. 43/8, 43/14
[51] Int. Cl. ............................................... A01k 73/12
[58] Field of Search ....................... 43/8, 14, 4.5, 21.2, 4

[56] References Cited

UNITED STATES PATENTS 1,390,006   9/1921   Akre ......................................... 43/8

FOREIGN PATENTS OR APPLICATIONS 80,962   11/1952   Norway ..................................... 43/14

*Primary Examiner*—Warner H. Camp
*Attorney*—Carl R. Brown

[57] ABSTRACT

In the operation of recovering a purse seine loaded with fish, a pickup line is passed through the gathered purse rings and attached at one end to a prong mounted on the side of the boat. By hoisting the other end of the pickup line the rings are made to slide on the prong and are retained in order, without the need for manual handling. When the empty net is being stowed, the rings strip off the prong in proper order. The prong is adjustable to an angularly upwardly extending position for purse seining, wherein the net is hauled through an overhead power block for stowage, and to a generally horizontal position for drum seining, wherein the stowed net is rolled on a drum.

9 Claims, 9 Drawing Figures

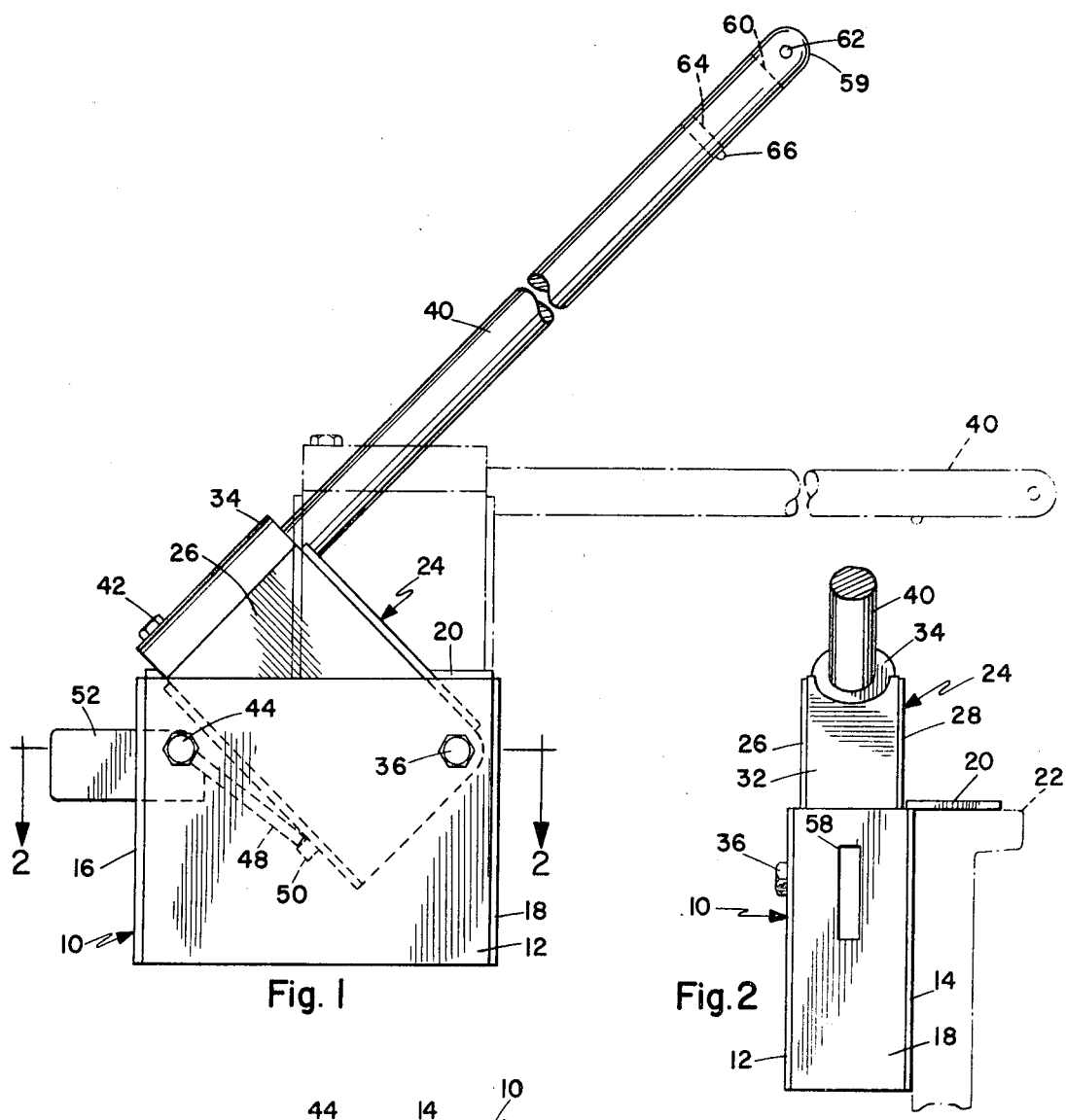

INVENTOR.
MORRIS L. WHALEY

BY Carl R. Brown
ATTORNEY

ADJUSTABLE PURSE RING STRIPPER

BACKGROUND OF THE INVENTION

In the operation of fishing by purse seining, a long net is deployed from floats to form a barrier, the lower edge of the net-carrying rings through which a pursing line or cable is threaded. With fish trapped in the net the pursing line is hauled in to close the bottom of the net, which is then pulled to the side of the boat. The basic technique is shown and described in my copending application, Ser. No. 791,199, filed Sept. 16, 1968 and entitled "Purse Ring Stripper and Method of Using" and now U.S. Pat. No. 3,481,065. To recover the net in an orderly manner and avoid entanglement, the rings are usually collected by hand and tied or otherwise arranged in groups on the deck. Since the rings are heavy and wet and the boat may be pitching and rolling, the operation is strenuous and requires considerable skill to avoid injury.

SUMMARY OF THE INVENTION

In the apparatus described herein, a prong is mounted on the side of the boat at the net recovery position and extends angularly upwardly from the side rail or bulwark. When the net is pursed and the rings gathered in the usual manner, a pickup line is passed through the rings and attached at one end to the upper end of the prong. When the other end of the pickup line is hoisted, the rings slide down onto the prong in proper order and are retained while the net is unloaded. To stow the net the pickup line is removed and the rings feed off the prong in order as the stowing progresses. In the fishing operation for tuna and the like, wherein the net is hoisted through an overhead power block, the prong remains in the upwardly extending position as the rings are stripped. When using the drum seining technique, as for salmon fishing, a simple latch allows the prong to be lowered to a generally horizontal position, so that the rings can feed off to the drum in the stern of the boat. An extension can be fitted on the prong in the lowered position when required, to support the rings in the proximity of the drum.

Other objects and many advantages of this invention will become more apparent upon a reading of the following detailed description and an examination of the drawings, wherein like reference numerals designate like parts throughout and in which:

BRIEF DESCRIPTION OF THE DRAWINGS

FIG. 1 is a side elevation view of the prong assembly, showing the two positions.

FIG. 2 is an end elevation view as taken from the right end of FIG. 1.

FIG. 3 is an enlarged sectional view taken on line 2—2 of FIG. 1, with the prong lowered.

DESCRIPTION OF THE PREFERRED EMBODIMENT

Figure 4:
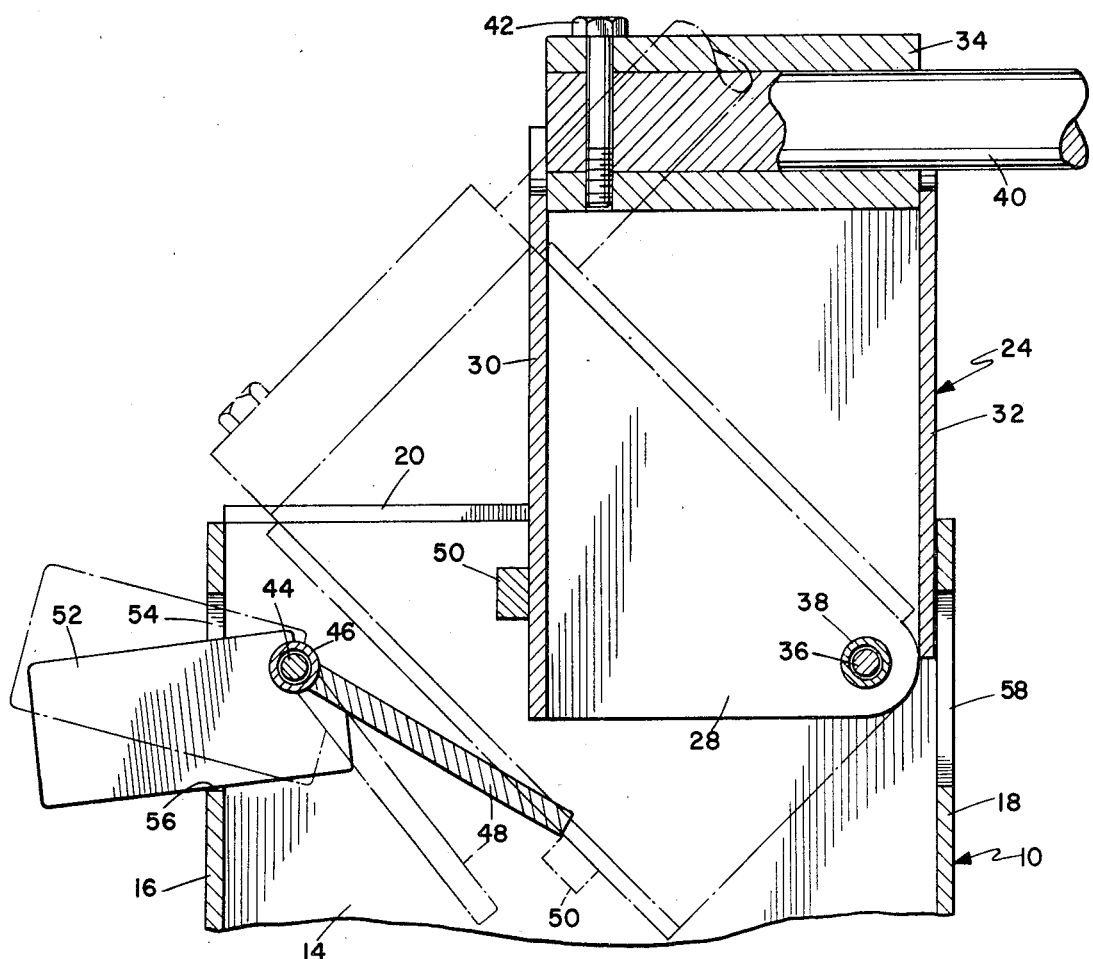
FIG. 4 is a sectional view taken on line 4—4 of FIG. 3.

The apparatus includes a mounting frame 10 having spaced parallel sideplates 12 and 14, connected by end plates 16 and 18 in an open box structure. Fixed to the top edge of sideplate 14 and extending outwardly is a support flange 20, which rests on the side rail or bulwark 22 of a boat, indicated in broken line in FIG. 2. Welding, bolts, or any other suitable means is used to secure the mounting frame in place, depending on the structure of the boat.

In the mounting frame 10 is a base member 24, comprising spaced parallel sideplates 26 and 28 connected by end plates 30 and 32 in a box structure, with a cylindrical sleeve 34 fixed to and closing the upper end of the box. Base member 24 is pivotally mounted on a bolt 36 through sideplate 12, and threaded into sideplate 14, adjacent end plate 18 in the upper portion of the mounting frame. The bolt passes through a spacer 38 between sideplates 26 and 28 at the lower corner of the base member adjacent end plate 32. An elongated prong 40 fits into sleeve 34 and is secured by a retaining bolt 42, the prong swinging in a substantially vertical plane when the base member pivots about bolt 36. The prong is of hardened steel bar material to withstand the wear encountered and the mass is distributed about bolt 36 so that the prong tends to fall to the down or horizontal position. In this position the end plate 32 of the base member bears against the end plate 18 of the mounting frame, providing a stop to hold the prong in the horizontal position, as in full line in FIG. 4.

Across the other end of mounting frame 10 adjacent end plate 16 is a bolt 44 secured in a similar manner to bolt 36. Pivotally mounted on bolt 44 is a sleeve 46 carrying a radially extending latch tongue 48, the outer end of which engages a stop 50 fixed on end plate 30. The stop 50 is positioned so that the latch tongue holds base member 24 with the prong 40 at the required upwardly inclined position, the weight of the prong holding the base member securely against the latch tongue. Fixed to sleeve 46 on the side opposite the latch tongue is a counterweight arm 52, which is heavier than the latch tongue. Arm 52 projects outwardly through a slot 54 in end plate 16, the bottom edge 56 of the slot acting as a stop to limit the downward motion of the arm, as in full line in FIG. 4. When arm 52 is lifted, as in the broken line position in FIG. 4, latch tongue 48 is disengaged from stop 50, leaving the base member and prong free to be lowered. The existing winch or hoist equipment available on the boat is used to raise and lower the prong and to take the load off the latch tongue for unlatching. When the prong is raised the latch tongue 48 will automatically engage stop 50 and be urged into latched position by the weight of arm 52. By locating bolts 36 and 44 symmetrically in mounting frame 10 and providing a slot 58 in end plate 18, similar to slot 54, the prong and latch units are reversible to adapt the structure to either the port or starboard side of a boat.

Figure 5:
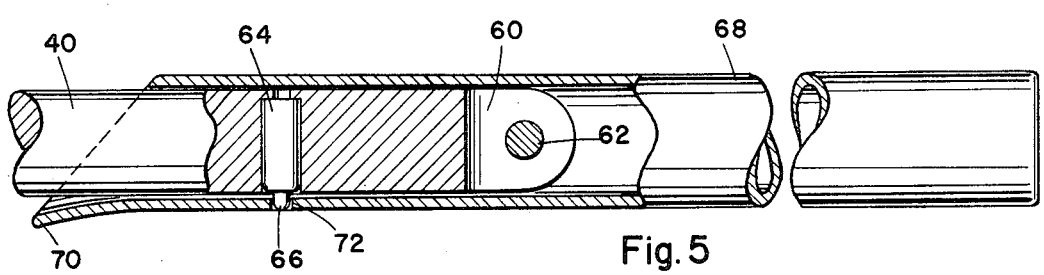
FIG. 5 is an enlarged view, partially sectioned, of the prong and extension connection.

The outer end 59 of prong 40 is smoothly rounded and has a diametrical slot 60, across which is a fixed pin 62. Adjacent the slotted end of the prong is a spring-loaded detent 64, of conventional type, secured diametrically in the prong with the detent pin 66 protruding from the underside. To extend the length of prong 40 when required, a tubular extension member 68 is fitted over the end of the prong, the end of the extension member having a curved lip 70 to ride over detent pin 66 and a socket 72 in which the detent pin seats, as in FIG. 5. The detent does not interfere with use of the prong without the extension.

Figure 6:
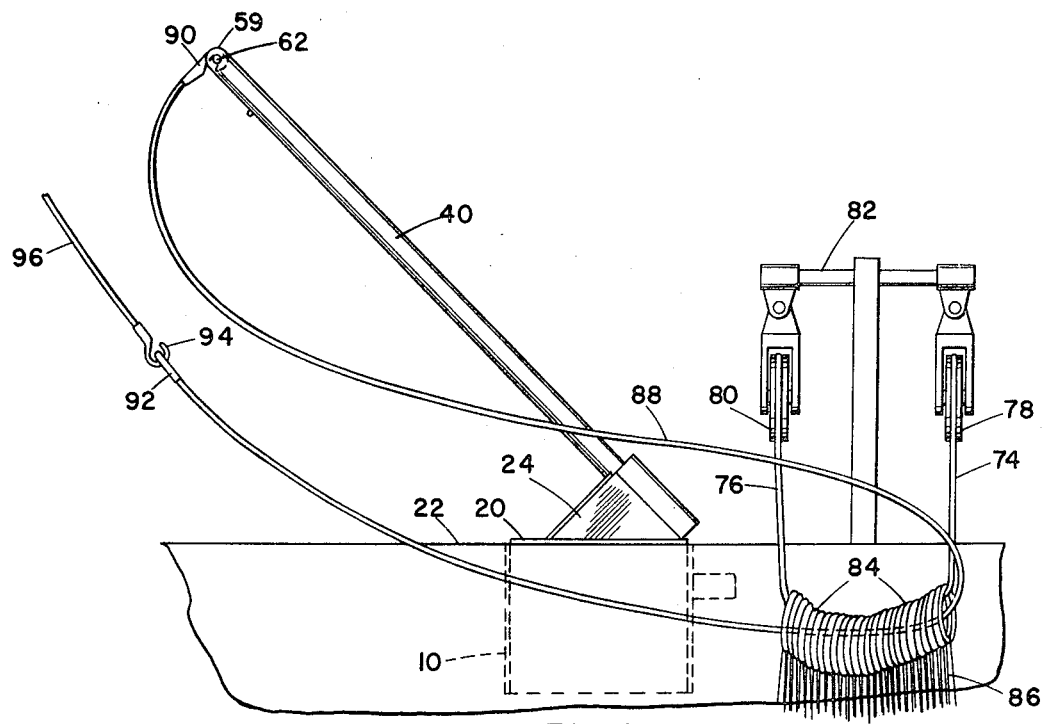
FIG. 6 is a view showing the apparatus in use at the initial connection of the pickup line.

In use the apparatus is installed on a boat adjacent the net recovery position with the prong extending aft. The two ends of the pursing line, which extends through the rings around the bottom of the net, are referred to as the bow pursing line 74 and the stern pursing line 76. In FIG. 6, the ends are shown as passing over a pair of pulleys 78 and 80 mounted on a davit 82. One or both ends are hauled in to purse the net, the rings 84 being gathered together as shown, with the yoke lines 86 extending from each ring to the net. With the rings gathered in an accessible position, a pickup line 88 is passed through the rings. Since the rings are large and the pickup line is of stranded steel cable, this is a simple operation. At one end of pickup line 88 is a hook 90, which is hooked over pin 62 at the end of prong 40. The hook 90 fits into slot 60 and is substantially equal in width to the diameter of the prong, so that the transition from the pickup line to the prong is as smooth as possible over the upper surface. At the other end of pickup line 88 is an eye 92 which is secured on the hook 94 of a hoist line 96 from an overhead hoist. The various winches and hoist equipment used with the apparatus are standard equipment on a purse seining boat and need not be illustrated.

Figure 7:
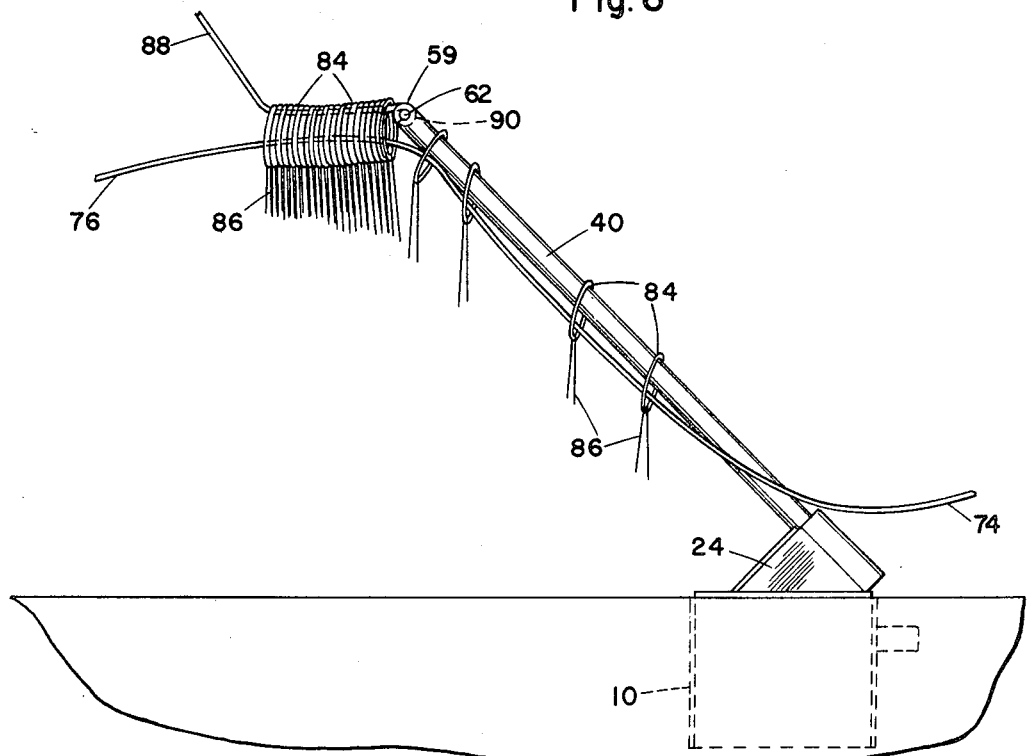
FIG. 7 shows the ring collecting action.

When hoist line 96 is hauled in, the pickup line 88 is pulled up and the gathered rings 84 are lifted and guided to the upper end of prong 40, as in FIG. 7, the stern pursing line 76 being released as necessary. Continued lifting of pickup line 88 causes the rings 84 to slide over prong 40 and collect on the prong in an orderly stack. The operation is very rapid and the deck area is left clear for recovery of the catch from the net. Once the rings are on the prong, the pickup line can be removed.

Figure 8:
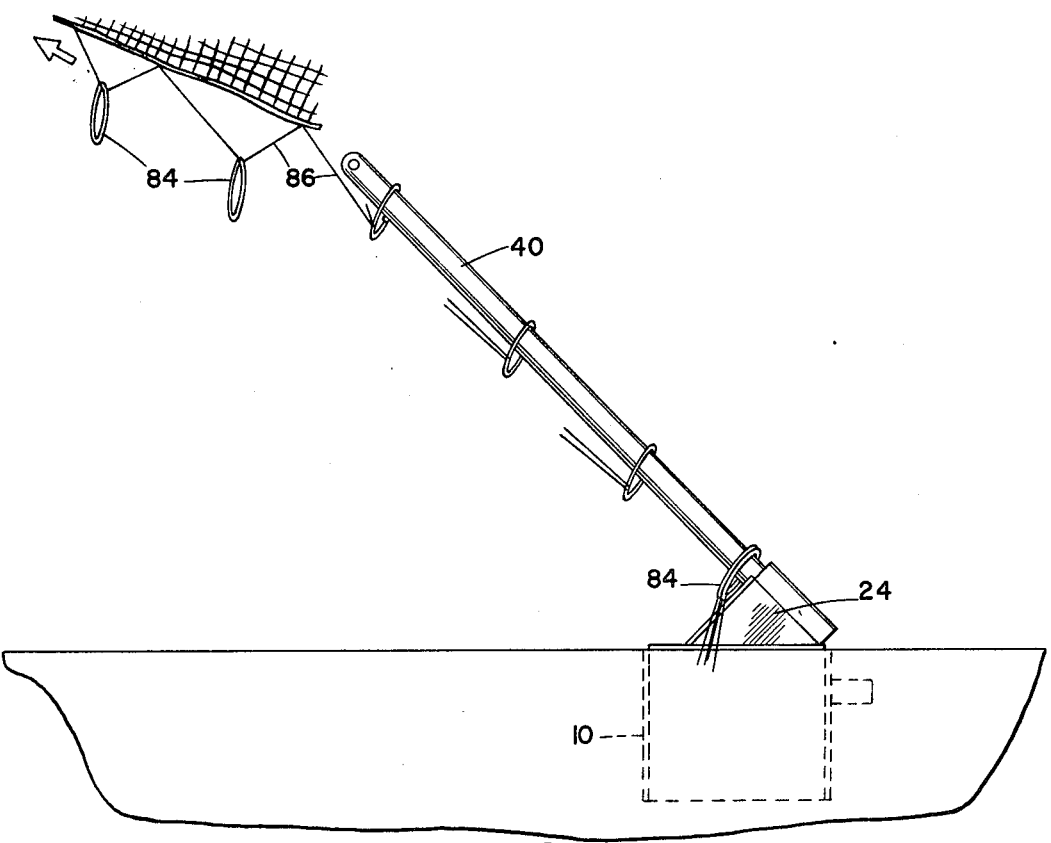
FIG. 8 shows the rings stripping off as the net is stowed.

The net is stowed by hoisting through an overhead power block, not shown, the technique being well known in the tuna fishing operation. As the net is hauled in and stowed on the afterdeck, the rings 84 strip successively off prong 40 in an orderly fashion as in FIG. 8.

Figure 9:
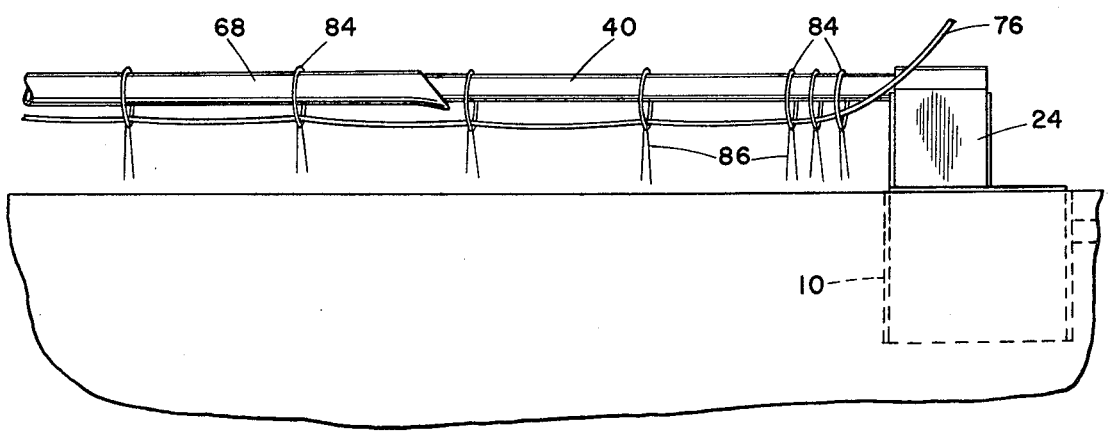
FIG. 9 shows the prong lowered with the extension in place for the drum seining operation.

In the drum seining operation, in which the net is stowed on a large drum at the stern of the boat, the prong 40 is lowered for the final stripping of the rings, as in FIG. 9. The rings thus slide horizontally as the net is rolled up on the drum, not shown. If the prong is installed at some distance from the drum, the extension 68 is used to support the rings to the vicinity of the drum.

At all times during the operation the rings are securely under control. This is particularly important during initial recovery of the pursed net, since slippage of a few rings can result in opening of the net and partial loss of the catch. The apparatus is adaptable to substantially all existing types of purse seining boats, merely by mounting the prong assembly on the boat. When not in use the prong is conveniently stowed in the lowered position.

Having described my invention I now claim.

1. An adjustable purse ring stripper comprising,
   a mounting frame having means for attachment to the side of a boat,
   a base member pivotally mounted in said frame to swing in a substantially vertical plane,
   an elongated prong fixed at one end to said base member,
   stop means on said mounting frame and base member to hold the prong selectively in an angularly upwardly extending position and a substantially horizontal position,
   and a purse ring guiding pickup line having means for connection to the other end of said prong.

2. A purse ring stripper according to claim 1, wherein said other end of the prong has a transverse slot and a pin extending across said slot, said pickup line having a hook for engagement with said pin, said hook having a width substantially equal to the cross-sectional width of the prong.

3. An adjustable purse ring stripper comprising,
   a mounting frame having means for attachment to the side of a boat,
   a base member pivotally mounted in said frame to swing in a substantially vertical plane,
   an elongated prong fixed at one end to said base member,
   stop means on said mounting frame and base member to hold the prong selectively in an angularly upwardly extending position and a substantially horizontal position,
   said stop means includes a latch pivotally mounted on said mounting frame,
   and a stop fixed to base member for engagement with said latch in the upwardly extending position of said prong.

4. A purse ring stripper according to claim 3, wherein said latch has a counterweight arm fixed thereto, biasing the latch to the engaged position with said stop, said arm projecting from said mounting frame for manual operation of the latch.

5. An adjustable purse ring stripper comprising,
   a mounting frame having means for attachment to the side of a boat,
   a base member pivotally mounted in said frame to swing in a substantially vertical plane,
   an elongated prong fixed at one end to said base member,
   stop means on said mounting frame and base member to hold the prong selectively in an angularly upwardly extending position and a substantially horizontal position,
   a tubular extension securable on the other end of said prong,
   and said prong having detent means for retaining said extension thereon.

6. A purse ring stripper comprising,
   a member having an elongated prong mounted on a boat,
   means for holding the prong in an angularly upwardly extenjing position,
   and means on the upper end of the prong for attaching the end of a line which line lifts the purse rings and slides the purse rings over the upper end of the prong, collecting the purse rings on the prong.

7. A purse ring stripper according to claim 6 including,
   means for pivotally mounting said prong to be capable of swinging in a substantially vertical plane.

8. A purse ring stripper according to claim 7 in which,
   said means for holding said prong having means for selectively holding said prong in a substantially horizontal position.

9. A purse ring stripper according to claim 6 in which,
   the upper end of said prong having an opening for receiving a hook member on the end of the line.

* * * * *